(12) United States Patent
Miller et al.

(10) Patent No.: US 7,692,524 B2
(45) Date of Patent: Apr. 6, 2010

(54) METHODS AND APPARATUS FOR FLUX DISPERSAL IN LINK INDUCTOR

(75) Inventors: David Donald Miller, Kitchener (CA); Loris Michael Dalfuoco, Stoney Creek (CA); Yuan Xiao, Kitchener (CA); Catalin Florin Gemanaru, Elmira (CA)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 839 days.

(21) Appl. No.: 11/456,295

(22) Filed: Jul. 10, 2006

(65) Prior Publication Data
US 2008/0007385 A1    Jan. 10, 2008

(51) Int. Cl.
*H01F 27/36* (2006.01)
(52) U.S. Cl. .................................................. 336/84 C
(58) Field of Classification Search .................... 336/65, 336/84 R, 84 C
See application file for complete search history.

(56) References Cited

U.S. PATENT DOCUMENTS

| | | | | |
|---|---|---|---|---|
| 2,114,189 A | * | 4/1938 | Kronmiller | 336/84 R |
| 2,533,920 A | * | 12/1950 | Crook | 307/149 |
| 3,142,029 A | * | 7/1964 | Keen, Jr. et al. | 336/84 R |
| 3,662,248 A | | 5/1972 | Amano et al. | |
| 4,001,665 A | | 1/1977 | Wisner et al. | |
| 4,602,308 A | * | 7/1986 | Montague | 361/91.5 |
| 4,725,804 A | * | 2/1988 | Yarpezeshkan | 336/5 |
| 5,546,065 A | * | 8/1996 | Vinciarelli et al. | 336/84 C |
| 5,905,642 A | | 5/1999 | Hammond | |
| 6,166,929 A | | 12/2000 | Ma et al. | |
| 6,269,010 B1 | | 7/2001 | Ma et al. | |
| 6,366,483 B1 | | 4/2002 | Ma et al. | |
| 6,617,814 B1 | | 9/2003 | Wu et al. | |
| 6,653,924 B2 | * | 11/2003 | Vinciarelli et al. | 336/212 |
| 6,867,564 B1 | | 3/2005 | Wu et al. | |
| 6,987,372 B1 | | 1/2006 | Wu et al. | |

FOREIGN PATENT DOCUMENTS

| | | |
|---|---|---|
| DE | 2036928 | 7/1970 |
| GB | 1307986 | 2/1973 |
| GB | 218918 | 9/1980 |
| JP | 55118615 | 11/1980 |
| JP | 58057719 | 6/1983 |
| JP | 580390004 | 7/1983 |

OTHER PUBLICATIONS

Search Report, EP 07 01 3417, Munich, Oct. 26, 2007, Van Den Berg, G.

* cited by examiner

*Primary Examiner*—Tuyen Nguyen
(74) *Attorney, Agent, or Firm*—Fay Sharpe, LLP; Alexander R. Kuszewski

(57) ABSTRACT

Inductors are described for motor drives or other power converters having an inductor connected in a switching circuit, with one or more conductive shields positioned between an inductor coil winding and a flux-carrying inductor core leg to redirect flux away from the coil winding so as to inhibit heating of the coil.

21 Claims, 7 Drawing Sheets

METHODS AND APPARATUS FOR FLUX DISPERSAL IN LINK INDUCTOR

FIELD OF THE INVENTION

The present invention relates generally to electrical power conversion and more particularly to controlling flux dispersal in link chokes or inductors of a power conversion system.

BACKGROUND OF THE INVENTION

Power conversion systems convert electrical power from one form to another and may be employed in a variety of applications such as motor drives for powering an electric motor using power from an input source. Typically, the power converter is constructed using electrical switches actuated in a controlled fashion to selectively convert input power to output power of a desired form such as single or multi-phase AC of a controlled amplitude, frequency and phase to drive an AC motor according to a desired speed profile and varying load conditions. Many such power converters receive input AC power from a single or multi-phase source and perform input switching to create an intermediate DC bus voltage. Output switches are then employed to create the desired AC output for driving a single or multi-phase AC electric motor or other AC load using power from the intermediate DC bus. In the initial AC-to-DC conversion, common-mode voltages are produced, which if unaddressed, may damage the motor windings. To address this problem, many motor drive converters include a DC link choke or inductor is provided with windings connected in the intermediate positive and negative DC current paths between the input and output switches to smooth the DC bus used to create the output voltages and currents and to mitigate common mode voltages at the converter output. However, certain operational conditions can lead to thermal stresses on the coil windings of the DC link inductor, whereby designers often need to oversize the inductor to ensure against premature failure of the inductor component of the motor drive. Although this approach provides suitable operation for the expected operating points over the designed motor drive product life cycle, the oversized inductor is costly in terms of size, weight, and expense. Thus, there is a need for improved power converter inductors that will withstand worst-case operating conditions without thermal failure without adding excessive size or weight to a motor drive or other host power conversion system.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The invention provides magnetic flux dispersion techniques and apparatus for power converter inductors by which inductors can be made to withstand extreme operational conditions without thermal breakdown of the inductor coil windings by redirecting magnetic flux away from the windings using conductive shields, and finds particular utility in association with AC motor drives having an intermediate DC bus with a link choke type inductor. However, it will be appreciated that the inductors and methods of the invention can be employed in a variety of power conversion systems and applications beyond motor drives.

In accordance with one or more aspects of the invention, an inductor is provided for a power conversion system, which includes a magnetic core and two winding coils wound around a winding leg of the core. The windings may be connected in the DC path between the input and output converter stages of a motor drive or other power converter such that current through the inductor coil windings creates flux in the winding core leg and two outer legs. The inductor further includes one or more flux dispersal shields mounted between one of the coil windings and one of the outer core legs to inhibit flux passing through the coil winding. The shield may thus advantageously intercept or redirect (e.g., disperse) some or all the flux that would otherwise cut through the inductor coil winding, thereby reducing excess coil heating, particularly for extreme operating conditions in the power converter. Indeed, the invention can be successfully employed in addressing high flux densities in the coil windings in unexpected conditions, such as where the converter is operated at less than maximum voltage or power ratings where the flux-related coil heating may be worse at lower power levels other than at maximum power values.

In a preferred embodiment, the shield is made of a highly conductive, non-ferrous material, such as copper or aluminum, and is mounted to the inductor core structure using electrically insulating mounting apparatus to avoid creation of circulating current paths for eddy currents resulting from the flux interception at the shield. The shields may be used in association with any form of inductor structure, wherein flux is dispersed to lessen the amount of flux crossing the coil windings. In certain embodiments, the first and second coil windings are wound around upper and lower portions of the winding leg, with the winding and outer legs being generally parallel to one another with the winding leg between the outer legs. In this example, the inductor may include four flux dispersal shields with a first shield disposed between the first coil winding and the first outer leg and a second shield between the first coil winding and the second outer leg, as well as a third shield disposed between the second coil winding and the first outer leg and a fourth shield between the second coil winding and the second outer leg. The shields, moreover, are preferably spaced from and insulated from the coil windings to prevent undesired shorting of the windings.

Another aspect of the invention provides a power conversion system comprised of an input for receiving input electrical power, an output for providing output electrical power, and a switching system comprising a plurality of switch circuits coupled with the input and the output to selectively provide power from the input to the output according to a plurality of switch control signals. An inductor is coupled with the switching system and includes a magnetic core with a top leg, a bottom leg, a winding leg extending between the top and bottom legs, as well as first and second outer legs extending between the bottom and top legs. First and second coil windings are provided around the winding leg, and at least one flux dispersal shield is mounted at least partially between one of the coil windings and at least a portion of one of the outer legs to inhibit flux passing from the outer leg through the coil winding.

Yet another aspect of the invention provides a method of reducing coil winding heating in a power conversion inductor having a magnetic core with a top leg, a bottom leg, with a winding leg and first and second outer legs extending between the top and bottom legs, and first and second coil windings wound around the winding leg. The method includes locating a conductive shield at least partially between one of the coil windings and at least a portion of one of the outer legs to inhibit flux passing through the coil winding.

BRIEF DESCRIPTION OF THE DRAWINGS

The following description and drawings set forth certain illustrative implementations of the invention in detail, which are indicative of several exemplary ways in which the various principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Figure 1:
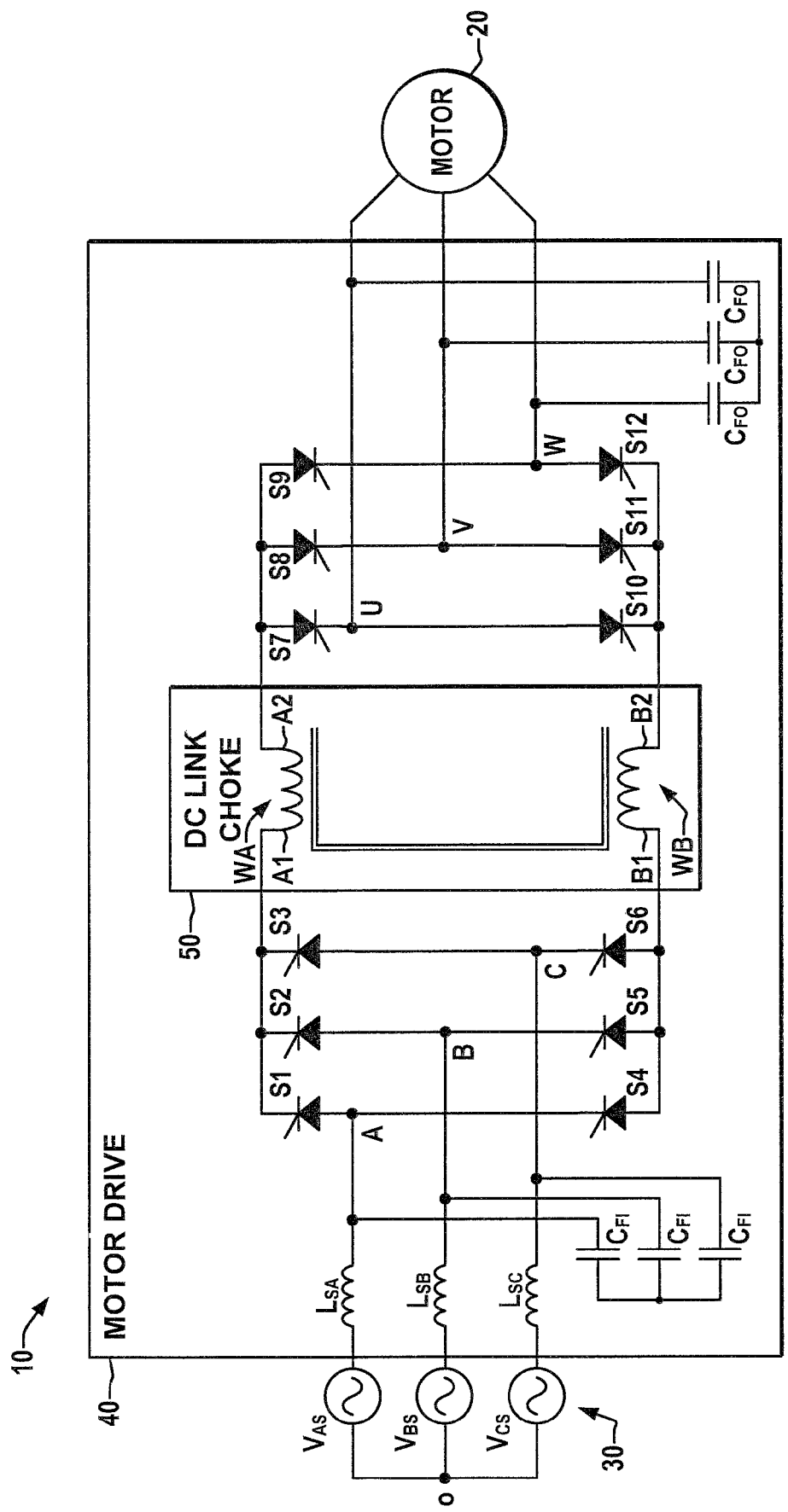
FIG. 1 is a schematic illustration of an exemplary motor drive power conversion system having a DC link choke or inductor in accordance with one or more aspects of the present invention.

Referring now to the figures, several embodiments or implementations of the present invention are hereinafter described in conjunction with the drawings, wherein like reference numerals are used to refer to like elements throughout, and wherein the various features are not necessarily drawn to scale.

Referring initially to FIG. 1, the invention relates to chokes or inductors which may be used in a motor drive power conversion system 10 for driving a motor load 20 or in association with other forms of power conversion apparatus in which input power from a source 30 of input electrical power is converted to output power. The exemplary system 10 is an AC-to-DC-to-AC converter that receives three-phase AC electrical power from an input source 30 and converts power from the input source 30 to three-phase AC output power used to drive the AC motor 20. In this example, the AC input power is switched by a first set of switches S1-S6 forming a switching regulator circuit or stage to create an intermediate DC bus and a second set of switches S7-S12 forming a switching inverter stage that selectively switches the DC power to provide AC output power for driving the motor 20, with a DC link choke or inductor 50 linking the first and second sets of switches. The switching devices S1-S6 and S7-S12 may be controlled according to any suitable type or form of switching scheme or schemes, such as pulse width modulation, etc., in open or closed-loop fashion, for example, with switching control signals being provided to the individual switches S1-S12 from one or more switching controllers (not shown) in order to implement a given power conversion task, wherein such controller(s) may be provided with one or more setpoint desired values and one or more feedback signals or values by which the output power is controlled, wherein such application-specific details are omitted so as not to obscure the various aspects of the present invention.

In the illustrated motor drive power converter application, the inductor 50 serves to provide a common mode DC link to smooth the DC power switched by the second set of switches S7-S12 and to suppress common-mode voltages in the motor windings, thereby reducing the amount of input-related switching noise and transients seen at the motor load 20, although the various aspects of the invention are not restricted to the illustrated system 10 or to motor drive DC link choke applications. In addition, the inductor 50 advantageously comprises one or more flux dispersion shields or structures 60 in accordance with one or more aspects of the invention as illustrated and described further hereinafter, and the inductor 50 and other inductors of the invention may find utility in motor drives or other power converters.

In one example shown schematically in FIG. 1, the DC link choke or inductor 50 is operatively connected in the DC current paths of the power conversion system 10, wherein the switches S1-S12 and the DC link inductor 50 constitute a motor drive 40 along with optional integral line reactors $L_{SA}$, $L_{SB}$, and $L_{SC}$ in series between the input phase sources $V_{AS}$, $V_{BS}$, and $V_{CS}$ and corresponding switch circuit input nodes A, B, and C, respectively, as well as optional input line filter capacitors $C_{FI}$ coupled with the input nodes A, B, and C. The motor drive 40 provides AC electric power to the three-phase AC motor 20 in a controlled fashion, wherein the motor load 20 may be an induction or other type of multi-phase AC motor. Moreover, the exemplary drive 40 may also optionally include integral output filter capacitors $C_{FO}$ connected along the output lines U, V, and W, although not a requirement of the present invention.

In operation, three-phase AC power from the input power source 30 is provided to an AC to DC converter stage comprising the first set of switches S1-S6 which are selectively actuated by control signals (not shown) thereto in order to generate DC power on a DC bus at the first ends A1 and B1 of the inductor windings WA and WB, respectively. DC power from the bus is then converted to AC motor power via a switching output stage such as an inverter comprising switches S7-S12 according to control signals (not shown) in any suitable manner in order to provide AC power of appropriate amplitude, frequency, and phase to the motor 20 in a controlled fashion. The inductor 50 includes a first winding WA in a positive DC path having a first end A1 connected to the upper input switches S1-S3 and a second end A2 coupled with the upper output switches S7-S9, along with a second winding WB in a negative or return DC path with a first end B1 coupled to the lower input switches S4-S6 and a second end B2 coupled to the lower output switches S10-S12.

Figure 2A:
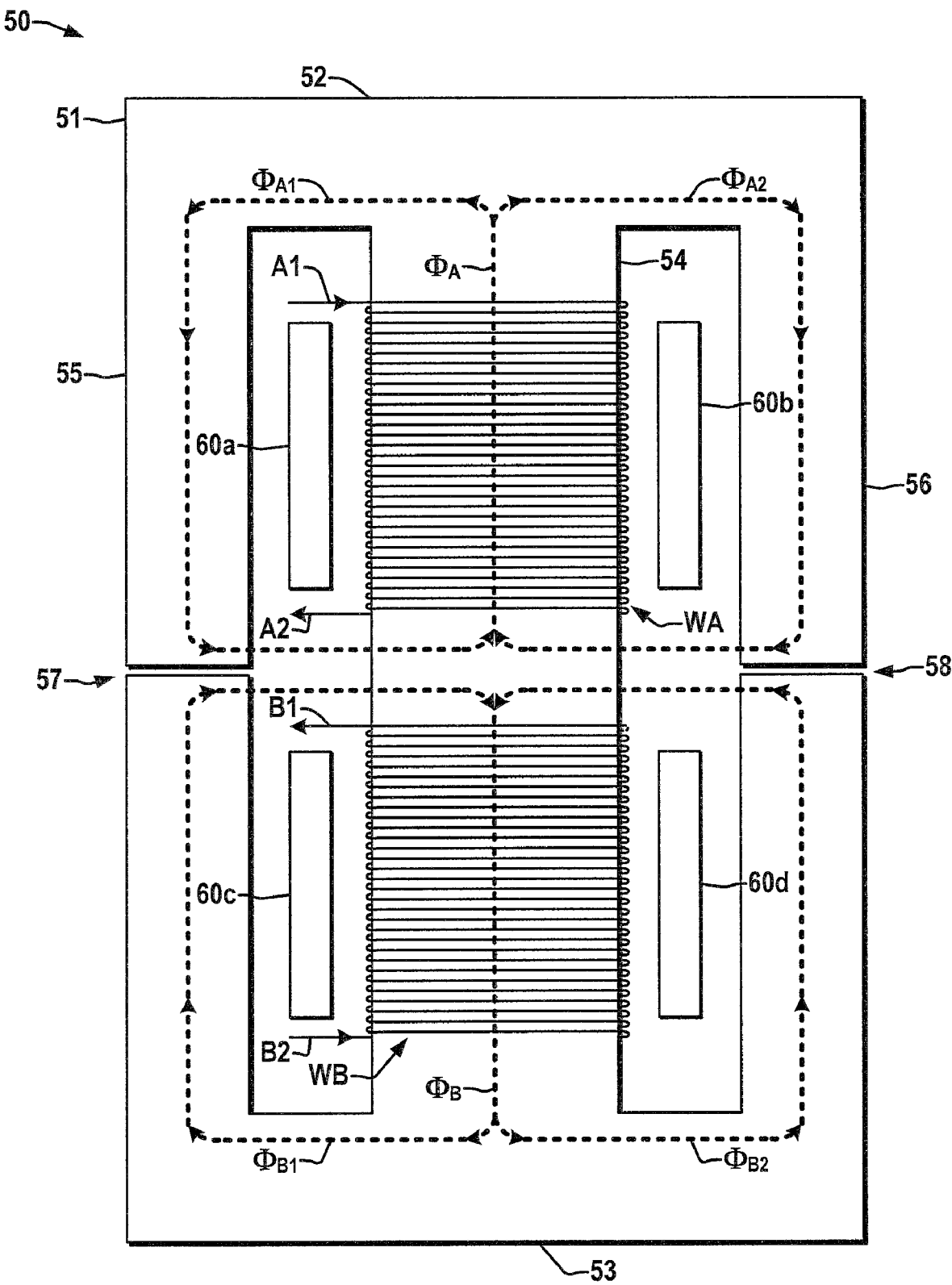
FIG. 2A is a simplified front elevation view of the link inductor schematically illustrating the link inductor windings, flux paths, and exemplary flux dispersal shields in accordance with the invention.
Figure 2B:
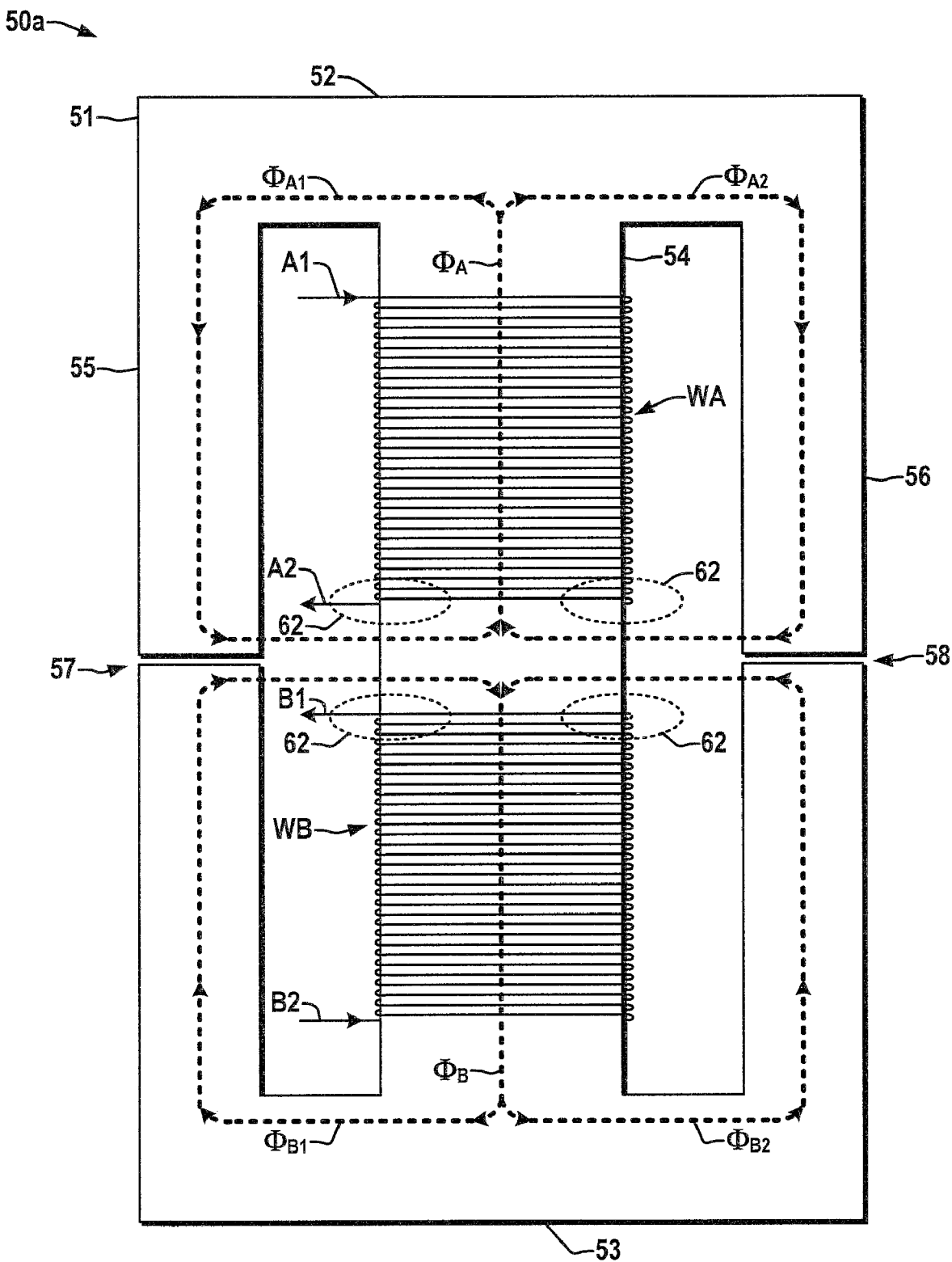
FIG. 2B is a schematic elevation view of a link inductor without flux dispersal shield, illustrating areas of undesired flux passing through portions of the coil windings.

Referring also to FIGS. 2A and 2B, a front elevation view of the link inductor 50 is shown in FIG. 2A with the inductor windings WA and WB illustrated in simplified form. The inductor 50 includes a magnetic core 51 with an inner winding leg 54 extending vertically between a top leg 52 and a bottom leg 53, as well as first and second vertically extending outer legs 55 and 56 having gaps 57 and 58 therein, respectively, wherein the outer legs 55 and 56 also extend from the top leg 52 to the bottom leg 53. The gaps 57 and 58 are approximately mid-way between the top and bottom legs 52 and 53 of the illustrated core 51, although these may alternatively be located elsewhere. The core 51 of the illustrated inductor 50 is a generally symmetrical planar design in which the winding and outer legs 54-56 are generally parallel to one another with the winding leg 54 being positioned generally between the outer legs 55 and 56, although other core designs may be used in which the legs need not be parallel and the winding leg 54 around which the coils WA and WB are wound need not be located directly or even partially between the outer legs 55, 56. Other embodiments, moreover, may include other legs beyond those illustrated in the example of FIG. 2A, wherein the outer legs 55, 56 need not be the outer-most legs of a given inductor design, and the term outer leg can constitute any inductor leg through which flux passes and which is proximate or adjacent all or a portion of one of the coil windings WA and/or WB. Furthermore, while the core 51 is illustrated as having a generally rectangular profile, core profiles and orientations other than those illustrated and described herein are contemplated, for example, rounded profiles, and the like, in planar or non-planar configurations, wherein the core 51 may be made of any suitable material(s) for creating a choke or inductor, as are known.

The first and second inductor windings WA and WB are formed of insulated conductive wire would around the upper and lower portions of the winding core leg 54, wherein the windings WA and WB are shown schematically in FIGS. 2A and 2B for illustrative purposes only, and in practice will typically include numerous layers of winding turns between the ends A1, A2 and B1, B2 around the winding leg 54. In general, the inductor 50 may include any number of turns for the windings WA and WB, and any suitable windings may be used of any suitable diameter or gauge, material, and insulation rating, wherein the windings WA and WB may, but need not, be similar in material, construction, number of turns, materials, etc. The individual windings of the coils WA and WB may be made of any suitable material as is known for conducting current, such as copper, aluminum, etc., and may include appropriate insulation and end terminations such as tabs A1, A2, B1, and B2 shown best in FIGS. 3, 5, and 6 below. Furthermore, the number of turns of the various coils may be determined according to a particular application, such as a specific motor drive or power conversion system. Moreover, the first and second coil windings WA and WB are wound around upper and lower portions of the winding leg 54, respectively, leaving an intermediate portion of the winding leg 54 exposed therebetween.

As best shown in FIG. 2A, in operation in the motor drive 40, the currents passing through the coil windings WA and WB create magnetic flux $\phi$ within the core 51, wherein two exemplary theoretical flux paths $\phi_A$ and $\phi_B$ are schematically drawn for flux related to currents in the windings WA and WB, respectively. In particular, with current flowing through the first coil winding WA in the direction from the first coil end A1 to the second end A2, flux $\phi_A$ is established in the upward direction in the upper portion of the winding leg 54, where this flux ideally separates into two generally similar symmetrically opposite flux paths $\phi_{A1}$ and $\phi_{A2}$ to the left and right, respectively, upon reaching the upper or top leg 52. These paths $\phi_{A1}$ and $\phi_{A2}$ continue downward through upper portions of the first and second outer legs 55 and 56, respectively, and thereafter across the space between the respective outer legs and the intermediate portion of the winding leg 54 between the windings WA and WB, after which the paths $\phi_{A1}$ and $\phi_{A2}$ join again and continue upward through the upper portion of the winding leg 54.

The flux path $\phi_B$, related to current in the second winding WB entering at the second end B2 and leaving through the first end B1, takes a symmetrically opposite route in a downward direction in the lower portion of the winding leg 54, thereafter separating in the bottom leg 53 into paths $\phi_{B1}$ and $\phi_{B2}$ which proceed upward through the lower portions of the outer legs 55 and 56, respectively. The ideal flux paths $\phi_{B1}$ and $\phi_{B2}$ then branch across the space between the outer legs 55 and 56 into the intermediate portion of the winding leg 54, and thereafter join and continue downward again through the lower portion of the winding leg 54. In the exemplary inductor 50, the fluxes $\phi_A$ and $\phi_B$ are thus generally opposite at the outer leg gaps 57 and 58 with the branch fluxes $\phi_{A1}$ and $\phi_{B1}$ in the first outer leg 55 being generally opposite and the branch fluxes $\phi_{A2}$ and $\phi_{B2}$ in the second outer leg 56 also being opposite. The winding coils WA and WB of the inductor 50 are thus configured such that currents therethrough cause flux in the outer core legs 55 and 56, wherein the corresponding flux paths $\phi_A$ and $\phi_B$ are merely examples, and core/winding structures are possible creating many different flux paths in which coils would around a first core leg cause flux within another leg that passes near a coil winding.

Referring briefly to FIG. 2B, another DC link inductor 50a is shown in FIG. 2B, similar in all respect to the inductor 50 of FIG. 2A except without the shields 60. In the case of FIG. 2B, the inventors have found that the areas of the inductor 50a near the outer leg gaps 57 and 58 may experience high flux densities. Furthermore, because the intended ideal flux paths $\phi_A$ and $\phi_B$ must cross the space between the outer legs 55, 56 and the intermediate portion of the inner winding leg 54, the flux may tend to jump or cut away from the outer core legs 55 and 56 early, and rather than passing to the winding leg 54 in the intermediate area between the windings WA and WB, some portion of the flux(es) $\phi_{A1}$, $\phi_{A2}$, $\phi_{B1}$, and/or $\phi_{B2}$ may pass or cut through the coil windings WA and/or WB themselves, particularly around the locations 62 shown in dashed lines in FIG. 2B. While not wishing to be tied to any particular theory, it is believed that localized heating of the winding coils WA and WB can occur at the locations 62, absent countermeasures using the exemplary shields 60 illustrated and described further below. In particular, eddy currents in the windings WA and WB in the areas encountering the fluxes $\phi_A$ and $\phi_B$ are believed to cause potentially excessive localized heating of the windings WA and WB in those areas, where this localized heating has been found to occur at operational points of the power converter that are not necessarily the maximum voltage or power settings. In this respect, it is believed that certain operating conditions may result in excessive flux densities in portions of the coil windings WA, WB, and as a result, the coil windings may overheat because of the convergence of magnetic flux lines cutting through the windings WA and WB and the resulting eddy currents. When this condition is combined with high ripple currents and less than optimal air cooling, localized overheating may be found, which can cause premature failure or degradation of the windings WA, WB, the insulation thereof, and the inductor 50a generally.

Referring now to FIGS. 2A and 3-6, in order to mitigate thermal stresses to the coil windings WA and WB, the exemplary inductor 50 includes four flux dispersal shields 60 positioned at least partially between the coil windings WA and WB and the outer core legs 55 and 56. Other embodiments are possible having any number of such shields 60, which may be positioned in any suitable locations at least partially between an outer core leg through which flux is transferred and a coil winding so as to mitigate the amount or likelihood of flux cutting through the winding. In this manner, the shields 60 operate to inhibit flux passing through the coil winding WA, WB and thereby mitigate the coil heating in the power converter inductor 50. In certain preferred implementations, the shields 60 comprise a conductive material, such as aluminum in one example, whereby eddy currents will be induced in the shield 60 by the flux $\phi$ rather than in the coil windings WA and WB. The shields 60, moreover, are preferably mounted to the core 51, directly or indirectly, using electrically insulating mounting apparatus and are preferably spaced from the windings WA, WB whereby the flux dispersal shields are electrically insulated from the coil windings, from each other, and from the core 51.

Figure 3:
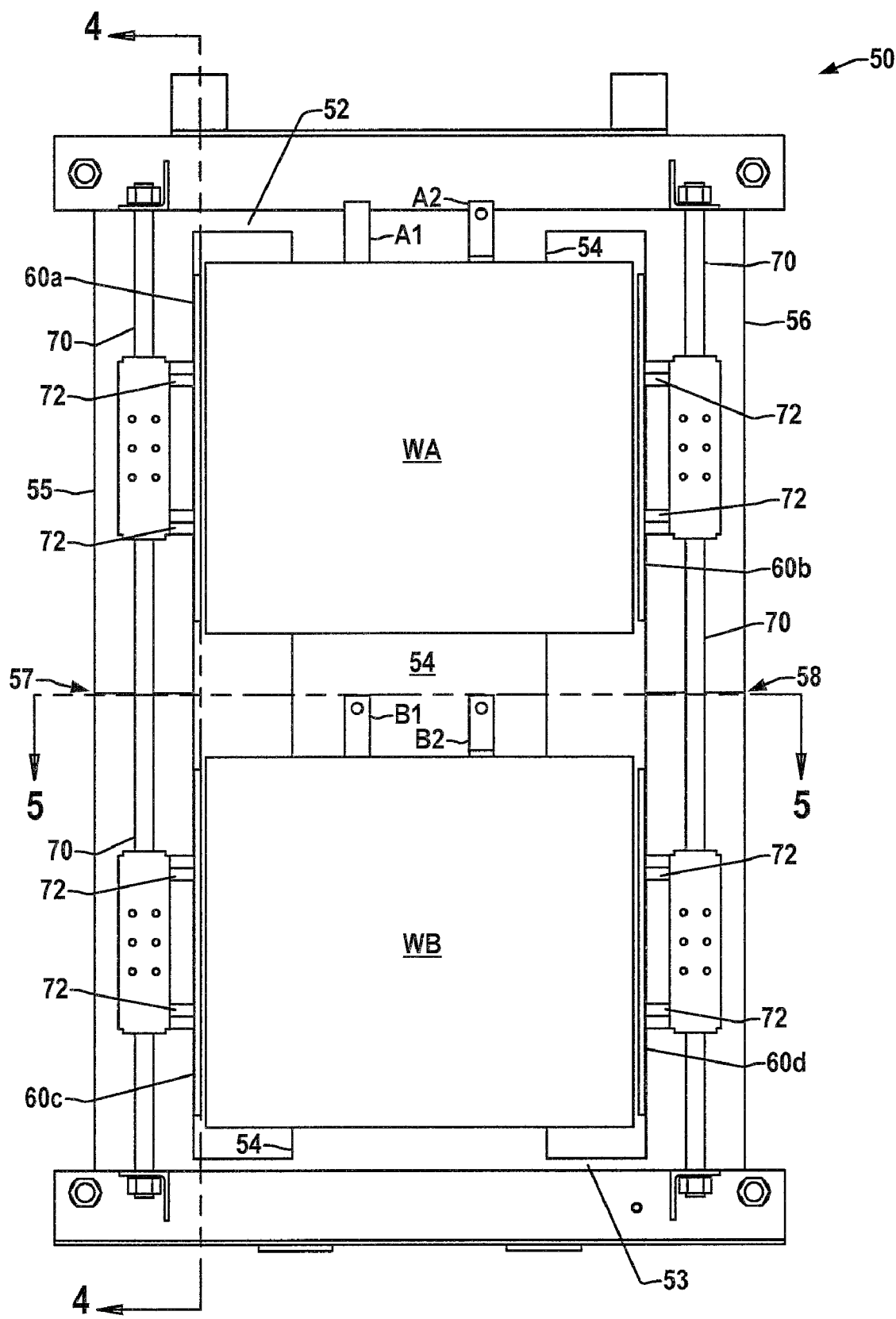
FIG. 3 is a detailed front elevation view illustrating the link inductor of FIGS. 1 and 2A with flux dispersal shields.
Figure 4:
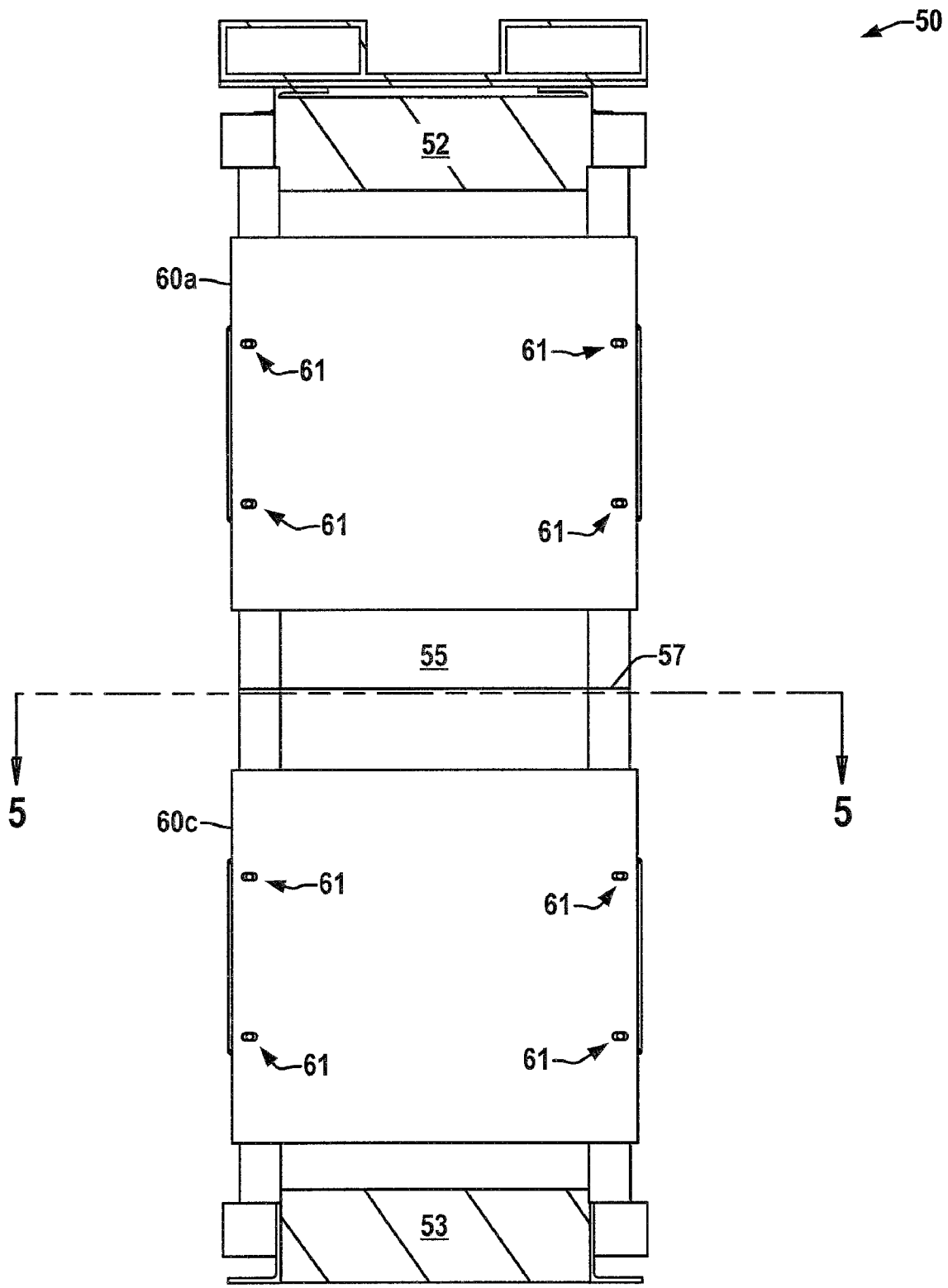
FIG. 4 is a partial sectional side elevation view in taken along line 4-4 in FIG. 3 illustrating further details of the exemplary side dispersal shields in the link inductor of FIGS. 1, 2A, and 3.
Figure 5:
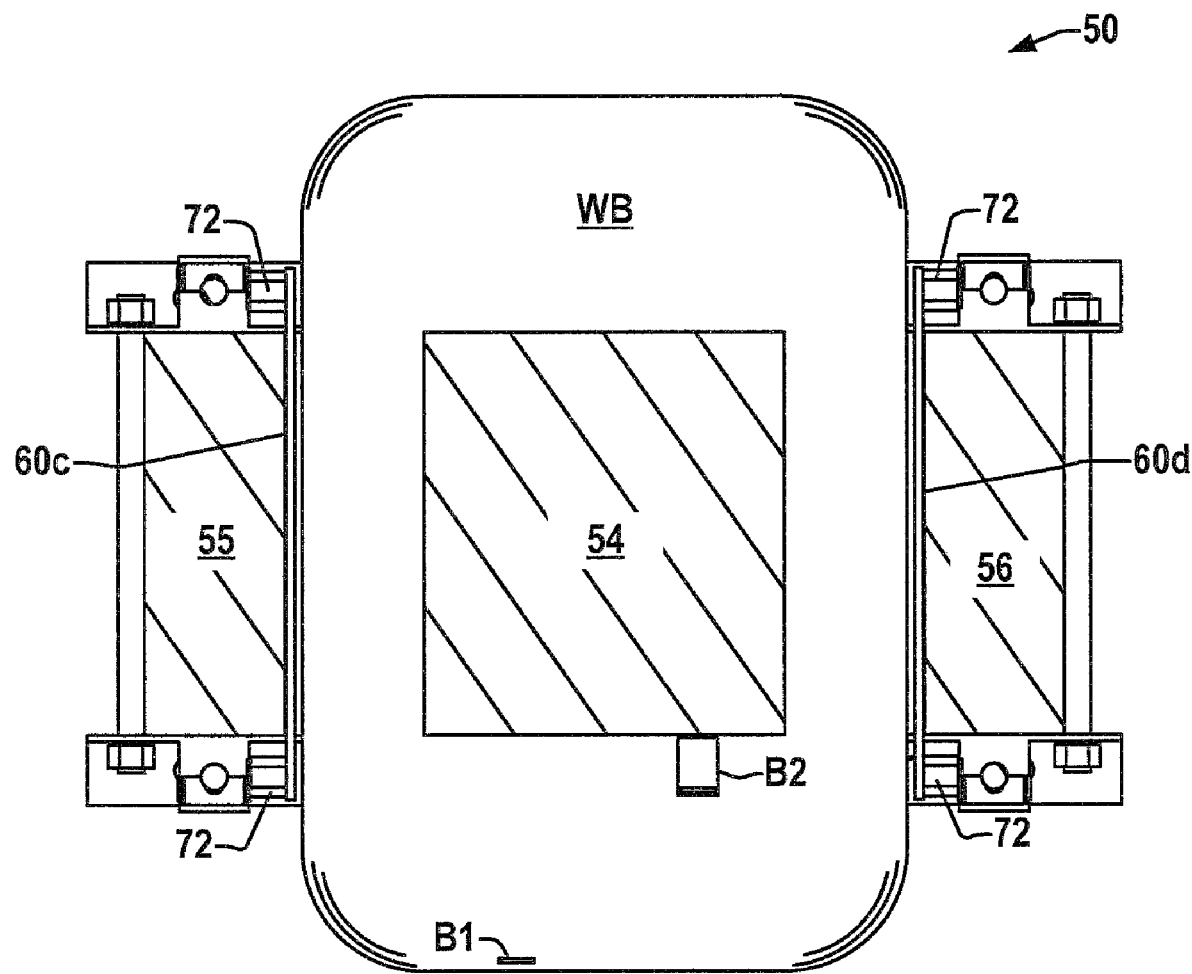
FIG. 5 is a partial sectional top plan view taken along line 5-5 of FIG. 3 illustrating further details of the link inductor of FIGS. 1, 2A, 3, and 4.
Figure 6:
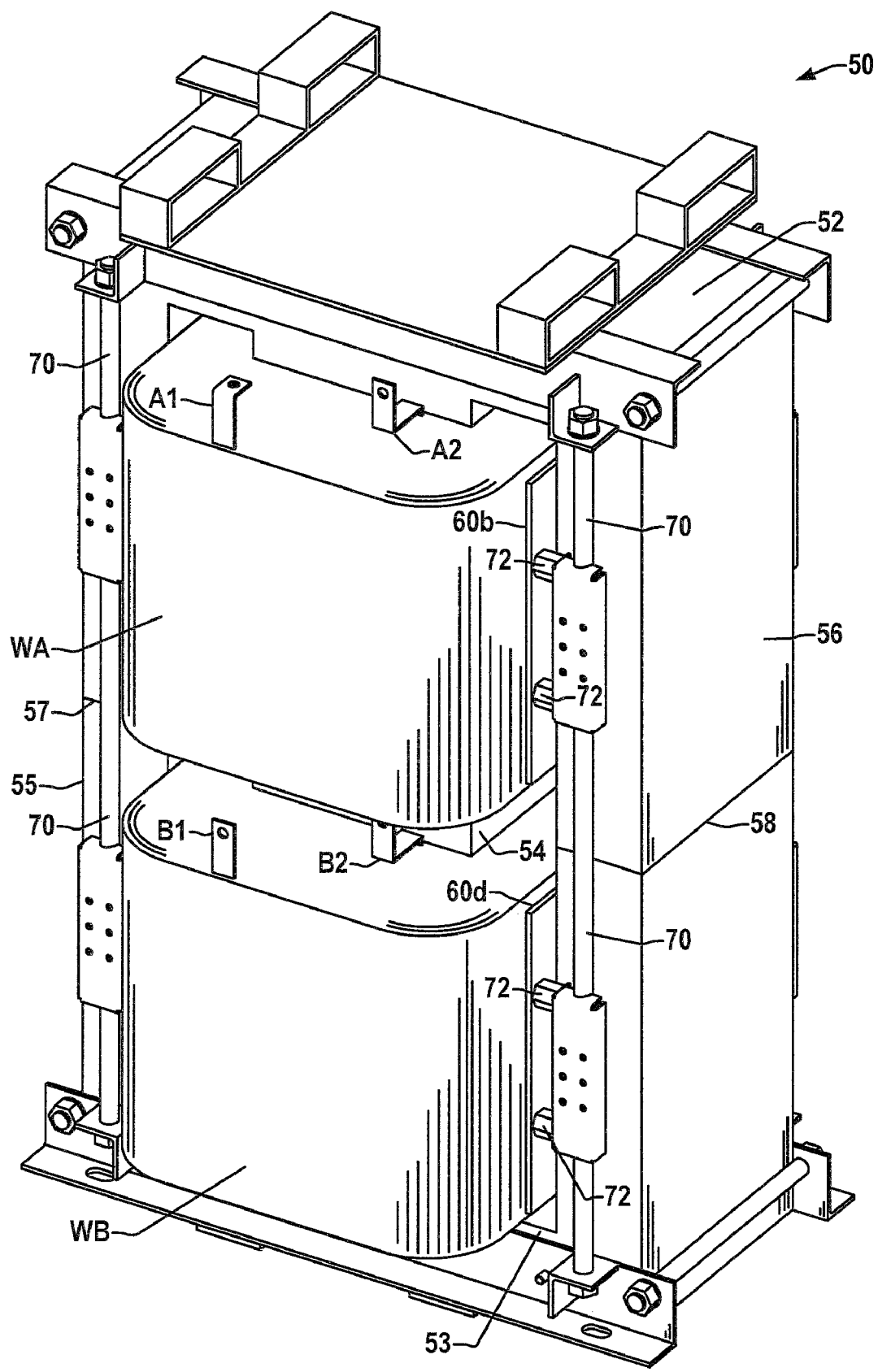
FIG. 6 is a perspective view illustrating the exemplary link inductor of FIGS. 1, 2A, and 3-5.

As best shown in FIGS. 2A and 3, the illustrated inductor 50 includes four shields 60, with a first flux dispersal shield 60a disposed between the first coil winding WA and the upper portion of the first outer leg 55 and a second shield 60b between the winding WA and the second outer leg 56. Similarly, a third shield 60c is mounted between the second coil winding WB and the outer leg 55 and a fourth shield 60d is positioned between the second coil WB and the lower portion of the second outer leg 56. As best shown in FIG. 4, the exemplary shields 60 are generally planar rectangular sheets of aluminum with suitable mounting holes 61 allowing for mounting of the shields 60 in a fixed position relative to the core 51 and the windings WA, WB. As shown in FIGS. 3, 5, and 6, moreover, the shields 60 are mounted to vertical supports 70 of the inductor core structure using electrically insulating mounting spacers 72 to locate the shields in fixed positions wholly or partially between the windings WA, WB and the outer legs 55, 56, with the insulated spacers 72 preventing current loops between the shields 60. This configuration provides adequate exposure of the shields 60 to circulating air within the drive 40 providing for cooling of the shields 60 themselves in operation, although heat sinking apparatus or other heat removal apparatus could optionally be included. In preferred implementations, moreover, the shields 60 are spaced slightly from the windings WA, WB to prevent inadvertent electrical shorting and may also be gapped from the inner walls of the outer core legs 55, 56, although not a requirement of the invention. In this regard, the shields 60 are generally easier to cool than are the coil windings WA, WB.

The shields 60 thus advantageously help to mitigate inductor overheating and winding damage wherein the shields 60 will essentially experience eddy current heating that would otherwise occur in the windings WA, WB, while allowing easier dissipation of the resulting thermal energy without requiring the inductor design to be oversized to safely operate at worst case conditions. In this regard, the shields 60 are preferably made from a material that is non-ferrous but highly conductive to maximize the eddy current effect on the shields 60 themselves. It will be appreciated that the inclusion of the shields 60 to intercept some amount of the flux $\phi$ that would otherwise cut through the coil windings WA, WB may result in a reduction in the winding inductance of the choke 50, wherein the design may be altered appropriately to compensate if desired. In this manner, the invention provides a solution to unanticipated flux paths in power converter inductors or chokes which can be implemented at minimal cost and without requiring redesign of existing inductors, by which thermal stresses to the inductor may be reduced or eliminated.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. An inductor for a power conversion system, comprising:
    a magnetic core with a top leg, a bottom leg, a winding leg extending between the top and bottom legs, and first and second outer legs extending between the bottom and top legs with the first outer leg including a first gap and the second outer leg including a second gap;
    first and second coil windings wound around the winding leg, each coil winding including a pair of ends coupled to corresponding nodes in a power conversion system; and
    at least one non-ferrous flux dispersal shield mounted at least partially between one of the coil windings and a portion of one of the outer legs to inhibit flux passing through the coil winding, wherein the flux dispersal shield is mounted to the core using electrically insulating mounting apparatus.

2. The inductor of claim 1, wherein the flux dispersal shield comprises a conductive material.

3. The inductor of claim 2, wherein the flux dispersal shield comprises aluminum.

4. The inductor of claim 1, wherein the first and second coil windings are wound around first and second portions of the winding leg, respectively, leaving an intermediate portion of the winding leg exposed between the first and second coil windings.

5. The inductor of claim 4, wherein the winding and outer legs are generally parallel to one another with the winding leg between the outer legs.

6. The inductor of claim 5, comprising:
    a first flux dispersal shield disposed between the first coil winding and the first outer leg;
    a second flux dispersal shield disposed between the first coil winding and the second outer leg;
    a third flux dispersal shield disposed between the second coil winding and the first outer leg; and
    a fourth flux dispersal shield disposed between the second coil winding and the second outer leg.

7. The inductor of claim 6, wherein the flux dispersal shields each comprises a conductive material.

8. The inductor of claim 6, wherein the flux dispersal shields are electrically insulated from the coil windings.

9. The inductor of claim 4, comprising:
    a first flux dispersal shield disposed between the first coil winding and the first outer leg;
    a second flux dispersal shield disposed between the first coil winding and the second outer leg;
    a third flux dispersal shield disposed between the second coil winding and the first outer leg; and
    a fourth flux dispersal shield disposed between the second coil winding and the second outer leg.

10. The inductor of claim 1, wherein the flux dispersal shield comprises copper.

11. The inductor of claim 1, wherein the flux dispersal shield is spaced from the coil windings.

12. The inductor of claim 1, comprising:
a first flux dispersal shield disposed between the first coil winding and the first outer leg;
a second flux dispersal shield disposed between the first coil winding and the second outer leg;
a third flux dispersal shield disposed between the second coil winding and the first outer leg; and
a fourth flux dispersal shield disposed between the second coil winding and the second outer leg.

13. The inductor of claim 12, wherein the flux dispersal shields each comprises a conductive material.

14. The inductor of claim 12, wherein the flux dispersal shields are electrically insulated from the coil windings.

15. A method of reducing coil winding heating in a power conversion inductor having a magnetic core with a top leg, a bottom leg, with a winding leg and first and second outer legs extending between the top and bottom legs, and first and second coil windings wound around the winding leg, the method comprising:
mounting a non-ferrous conductive shield to the core using electrically insulating mounting apparatus to locate the shield at least partially between one of the coil windings and at least a portion of one of the outer legs to inhibit flux passing through the coil winding.

16. The inductor of claim 12, where the first, second, third, and fourth flux dispersal shields are planar rectangular sheets of non-ferrous conductive material individually having mounting holes for mounting the shields in a fixed position relative to the core and the windings, the inductor further comprising:
a plurality of vertical support structures mounted to the core; and
a plurality of electrically insulating mounting spacers used to mount the individual shields to at least one of the vertical support structures in fixed positions wholly or partially between a corresponding winding and a corresponding outer leg with the shields spaced from the windings and with the insulated spacers preventing current loops between the shields.

17. The inductor of claim 16, wherein the shields are spaced from the inner walls of the outer core legs.

18. The inductor of claim 1, where the flux dispersal shield is a planar rectangular sheet of non-ferrous conductive material individually having mounting holes for mounting the shield in a fixed position relative to the core and the windings, the inductor further comprising:
a plurality of vertical support structures mounted to the core; and
a plurality of electrically insulating mounting spacers used to mount the shield to at least one of the vertical support structures in a fixed position wholly or partially between at least one of the windings and the outer leg with the shield spaced from the windings.

19. The inductor of claim 18, wherein the shield is spaced from the inner walls of the outer core legs.

20. The method of claim 15, wherein the power conversion inductor comprises plurality of vertical support structures mounted to the core, and wherein mounting a non-ferrous conductive shield to the core comprises:
mounting a first planar flux dispersal shield made of a non-ferrous conductive material to at least one of the vertical support structures using at least one electrically insulating mounting spacer to locate the first shield at least partially between the first coil winding and the first outer leg;
mounting a second planar flux dispersal shield made of a non-ferrous conductive material to at least one of the vertical support structures using at least one electrically insulating mounting spacer to locate the second shield at least partially between the first coil winding and the second outer leg;
mounting a third planar flux dispersal shield made of a non-ferrous conductive material to at least one of the vertical support structures using at least one electrically insulating mounting spacer to locate the third shield at least partially between the second coil winding and the first outer leg; and
mounting a fourth planar flux dispersal shield made of a non-ferrous conductive material to at least one of the vertical support structures using at least one electrically insulating mounting spacer to locate the fourth shield at least partially between the second coil winding and the second outer leg.

21. The method of claim 16, wherein mounting a non-ferrous conductive shield to the core comprises spacing the shields from the outer core legs.

* * * * *